Nov. 28, 1939.  J. A. H. BARKEIJ  2,181,541
POWER TRANSMISSION MECHANISM
Filed July 20, 1931   2 Sheets-Sheet 2
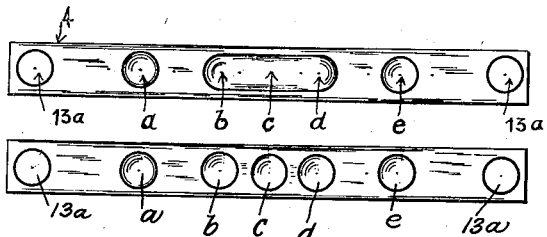
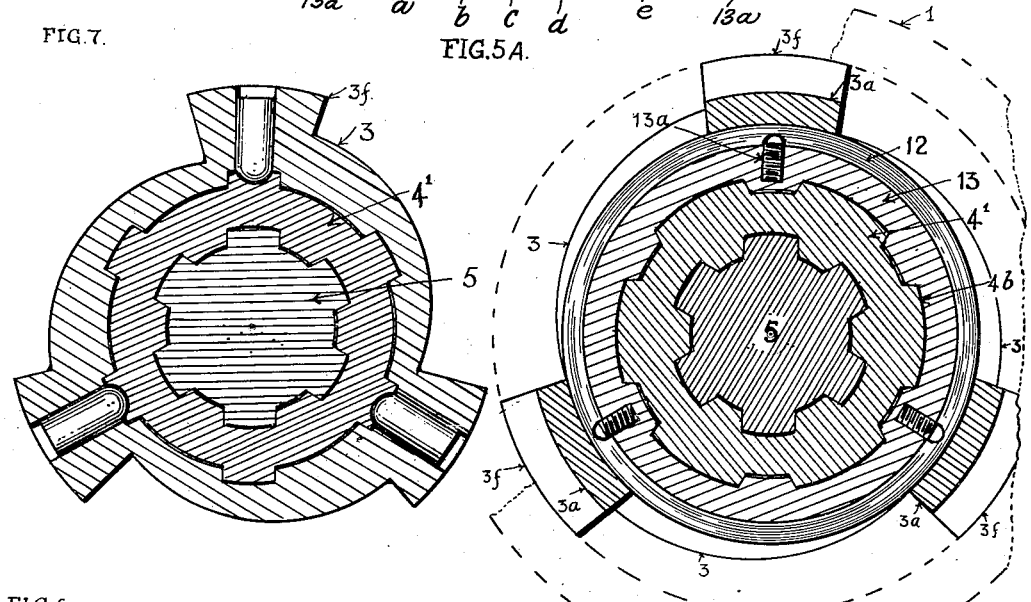
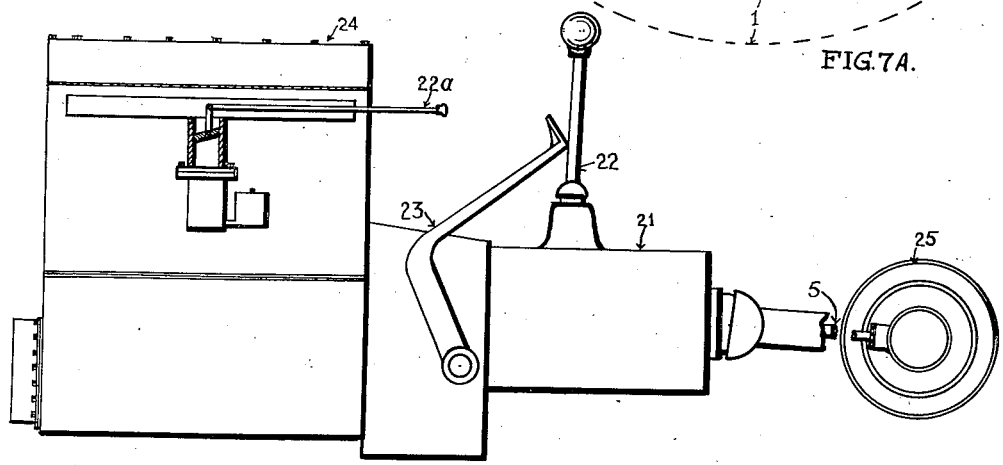
INVENTOR.
J.A.H. Barkeij Patented Nov. 28, 1939

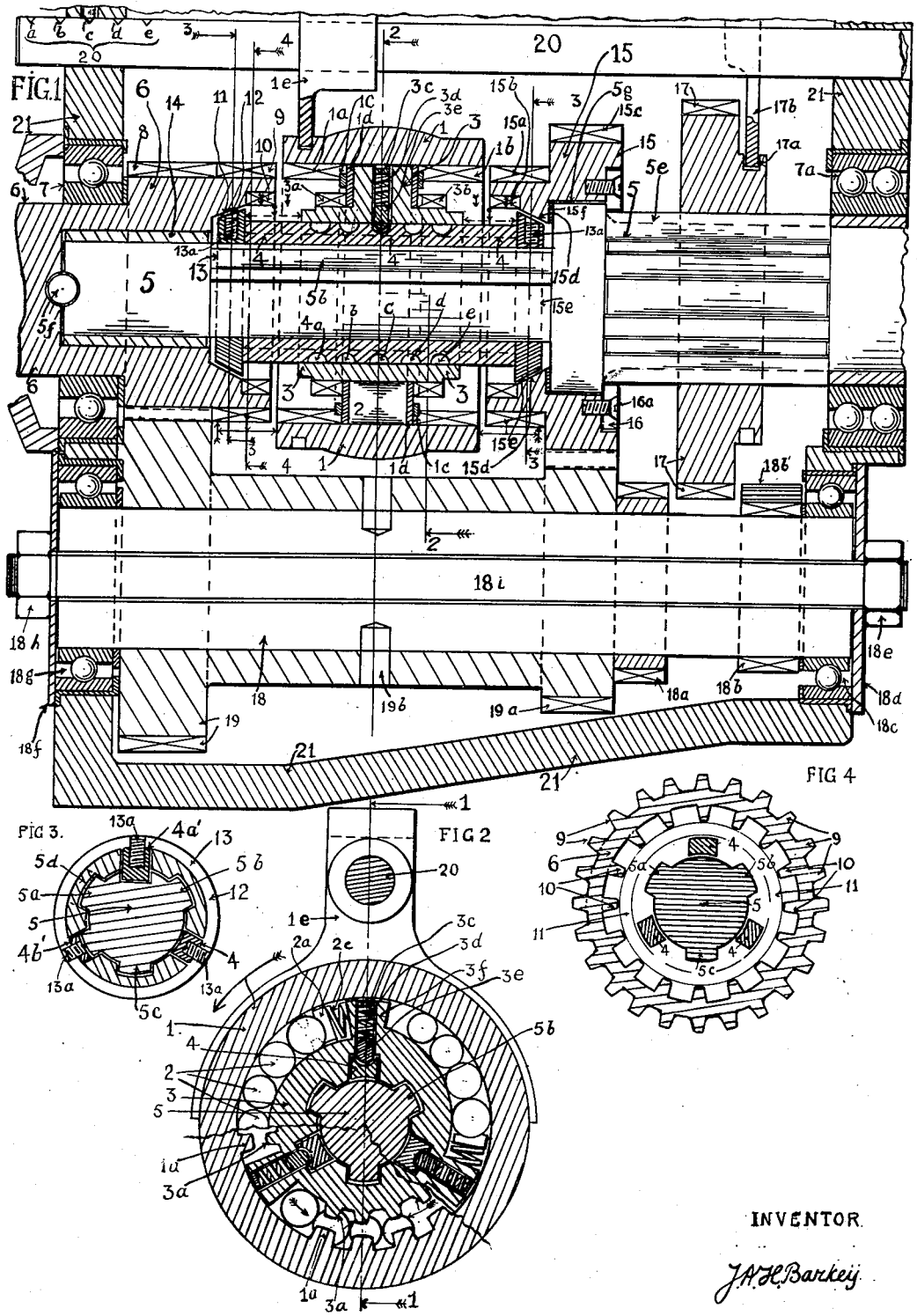

2,181,541

UNITED STATES PATENT OFFICE 2,181,541

POWER TRANSMISSION MECHANISM

Jean A. H. Barkeij, Altadena, Calif.

Application July 20, 1931, Serial No. 551,980

26 Claims. (Cl. 192—48)

My invention relates more particularly to transmission mechanism for automobiles and trucks, involving means for driving the propeller shaft, connected with an axle(s) and wheels, at different speeds forwards and backwards under the control of the operator.

The present invention is a modification of the synchromesh mechanism proposed in my application No. 493,458 of Nov. 4, 1930, and in my application No. 514,613 of Feb. 9, 1931. The present synchromesh arrangement may be either used singly or in combination with an overrunning clutch, operating entirely independently of said synchromesh mechanism. Said overrunning clutch has enough friction so as to take the outer member carrying positive clutch members for the freewheel shift along with the rotational speed about, of that of the transmission shaft or wheels of the vehicle, when said shiftable gears are in neutral position, or passing neutral position.

My first object is to have enough friction in said freewheel or overrunning clutch so that the transmission shaft rotates the shiftable clutch members on the outer member of said freewheel, there being an overrunning clutch between said outer member and the inner member thereof. Said clutch members on said outer member may mesh without synchronisation with the component clutch members on two gear wheels on either side of said outer member. Said positive clutch members on said outer member adjusting readily its rotational speed upon touching and then meshing the positive clutch members on said gear wheels. However, also this outer member of this freewheel may be synchronised by means which are substantially the same as those used for the synchronisation of positive clutch members on the inner member of said freewheel for a solid gear shift. The synchronisations of either or both shifts, the freewheel and solid gear shift, may be incorporated.

My second object is to provide a temporary friction between a synchronising sleeve below the inner ring of said freewheel (below the freewheel rollers therein) and two gear wheels on opposite sides of said inner ring during a shift of said inner ring and to decrease or release said friction exactly before said inner ring is positively connected with said gear wheels. Said synchronising sleeve is preferentially provided with conical friction faces to be engaged with corresponding conical friction faces on or associated with said gear wheels, and said inner ring (or sleeve) is provided with positive dog or claw clutch members to be engaged with corresponding dog or claw clutch members on said gear wheels, shortly after said friction between said synchronising clutch faces has been released, as will be explained hereafter in detail.

Between said inner ring and synchronising sleeve are located resilient means the function of which will be explained also later.

My third object is to obtain the said first two objects by means of a single gear shift lever.

My fourth object is to obtain the second object by the use of two clutch members slidable on the transmission shaft and actuated by means of plungers and springs from the gear shift lever, so that the shifting rod between said lever and said shiftable gears can omit the usual plungers and springs between the shifting rod (20) and the gear box proper to indicate to the driver the position of the shiftable clutch unit.

My fifth object is to apply said foregoing objects between the high-speed drive and second speed drive, with the smallest number of operating parts, for freewheel drive, or solid drive position, or both.

My sixth object is to combine a synchromesh clutch shift with a freewheel clutch shift in one unit, operative with a single lever.

Although only a single arrangement for two different speed ratios has been shown, it is understood that said objects may be duplicated, or may be aplied in modified form on more than two speeds, and may be modified in general without deviation from the general scope of this application.

Referring to the drawings which illustrate only one embodiment of the invention, Fig. 1 is a vertical section of a gear box and illustrating especially Fig. 2 on the section line 1—1 of Fig. 2.

Fig. 2 is a vertical section of the shiftable unit between clutch shaft and transmission shaft, on the section line 2—2 of Fig. 1.

Fig. 3 is a vertical section of the synchromesh clutch of Fig. 1 on the section line 3—3 thereof.

Fig. 4 is a vertical section of the clutch member (10, 9) on the clutch shaft, the rods connecting the two synchromesh clutch elements for high and second gear, and of the transmission shaft, having a bearing in the clutch shaft.

Fig. 5 is a top view of said rods connecting said two synchromesh clutch elements, showing in the middle the holes $a$, $b$, $c$, $d$, $e$ therein to cooperate with the plungers and springs located in the inner ring 3 of the overrunning clutch, to effect a temporary friction between said inner ring and the clutch shaft and second speed gear freely rotating on the transmission shaft 5, in order to effect a synchronisation between the clutch members 9 and 1a and 1b and 15a for a one-way drive, and a synchronisation between the clutch members 10 and 3a and 3b and 15b for a two-way drive, respectively in high gear and second gear drive. The outer holes 13a are for pins to connect said rods and said clutch elements solidly.

Fig. 5A shows a modification of Fig. 5. Instead of three detent holes, or indentions, there are applied 5. The function of these holes will be explained in detail later on.

Fig. 6 shows the general arrangement of motor, clutch, gear box and wheels, and a single gear shift lever.

Fig. 7 shows a modified connector 4' between ring 3 and shaft 5.

Fig. 7A shows the beveled friction clutch element or clutch member 12, on the modified connector 4$^1$ of Fig. 7 at an angle perpendicular to the side-view of said clutch element in Fig. 1, and on the same section line 3—3 as shown in Fig. 1. Fig. 7A is drawn with a larger inner member with eccentric curvatures and the teeth 3a are drawn as large dog clutches only three in number to facilitate the meshing in solid gear.

1 indicates the outer ring, 2 the rollers and 3 the inner ring of the overrunning clutch. 1a is the left, 1b the right internal clutch member of the outer ring, and 3a and 3b are the external clutch members of the inner ring. 3c, 3d, 3e are respectively the plug, spring, and plunger in said inner ring to effect the operation of the synchromesh clutches, as will be explained hereafter. 4 are the three rods connecting two small clutch elements 13 and 15e and are located in holes between the inner ring 3 and the transmission shaft 5. In said rods are five holes cooperating with said plungers 3e, when the unit 1, 2, 3 is shifted to the right or to the left. Inner clutch ring 3 is splined, over the rods 4, to the splined transmission shaft 5. 7 is the outer, left, ball bearing, 7a the outer right ball bearing respectively for clutch shaft 6 and transmission shaft 5, said latter shaft having a bearing 14 in said clutch shaft. 8 is the gear on the clutch shaft in constant mesh with gear 19 on the countershaft 18. 9 is the clutch member on said same shaft to be meshed for high gear freewheel with clutch member 1a on the outer ring 1, and 10 is the internal clutch member on said clutch shaft to be meshed for solid high gear drive with clutch member 3a on the inner ring 3. 11 is the beveled clutch surface to be meshed with the beveled surface 12 on the clutch element 13.

15 is a gear freely rotating on the transmission shaft 5. 15a is the external clutch member to be meshed for second gear freewheel with clutch member 1b on the outer ring 1. 15b is the internal clutch member thereon, to be meshed for second gear solid drive with clutch member 3b on the inner ring 3. 15c are teeth on gear 15 in constant mesh with the gear 19a for second speed on the countershaft 18.

15d is the beveled clutch surface on said gear 15, and 15e a similar beveled surface on a clutch element connected to the rods 4 shown in Fig. 5, or the modified rods shown in Fig. 5A, to be meshed with each other by a gear shift lever 22 (see Fig. 6) prior to second gear, freewheel or solid gear transmission. These pairs of clutch elements or clutch faces 11 and 13 and 15d and 15e may be equally applied on the outer ends of a synchronising sleeve 4$^1$ as shown in Figs. 7 and 7A.

A ring 16, attached with bolts, or screws, 16a, holds the gear 15 in position with relation to gear 19a on the countershaft. Said gear has a shoulder on the left, right back of the beveled surface 15d, and the ring 16 forms the right shoulder so that longitudinal movement is precluded. The gear 17 is splined at 5e on the transmission shaft 5, and can be meshed for low gear with gear 18a on the countershaft, or with gear 18b for reverse gear via the intermediate gear 18b'.

The gears 19 and 19a for second gear form one piece and are solidly connected with the countershaft 18 by plugs 19b, or can be splined thereon, if preferred. Gears 18a and 18b form one part with the shaft 18, which has a central hole for a rod 18i, which rod is tightened with two nuts 18h and 18e, to two rings 18f and 18d, covering the two outer ball bearings 18g and 18c. The plates, 18f and 18d, rest on the gear box or rings containing the ball races 18g and 18c, so that the inner rings of the said ball races are not pinched between gear box and shaft 18, and are free to rotate. The outer rings of these ball races may be pinched by said plates 18f and 18d, if preferred.

The shiftable unit 1, 2, 3 is shifted by a fork 1e attached to a shifting rod 20, sliding in the walls of the gear box 21. Said shifting rod may have indentions 20a, b, c, d, e, and the rods 4 (or synchronising sleeve 4$^1$) shown in Fig. 5A have equivalent indentions, for reasons which differ from the indentions on rod 20. The single indention c on the shifting rod 20 cooperates indirectly with the centrally located, round, and spherical indentions c on the rods (or connector 4$^1$ of Figs. 7 and 7A) which cooperate directly with the spherical heads of the plungers 3e in the body 3, to keep the friction clutch elements on the connector 4$^1$ free from the corresponding friction cones on the gear wheels (respectively 12 and 15e on the connector 4$^1$, and 11 and 15d on the gear wheels 8 and 15) in neutral position. When the unit 3 and 4$^1$ is placed in neutral position by the gear shift lever and the motor is running, these conical friction elements cannot touch each other and cannot cause a grinding noise. Equally when the car is moving the gears 8 and 15 rotate with different speeds, and when the shift is in high gear the right pair of cones 15d and 15e should be separate from each other, and reversely when the shift is in second gear the conical faces 11 and 12 (also designated by 13, the total detachable friction cone on the connector 4$^1$) cannot touch each other, on account of the fact that the connector 4$^1$ is pinched between the main shaft 5 and the positive clutch element 3. Like in any standard gear shift, the indentions a and e on rod 20 hold the shift respectively in high and second gear, and in so far as these indentions a and e on the rod 20 cooperate with the spherical indentions on the connector 4$^1$, together with the plungers 3e and springs 3d to prevent the conical frictional elements to touch each other at the other end, opposite to the end which is positively clutched, they are functionally related to each other. If in the description and claims is spoken of spherical indentions and spherical elements, it is, of course, understood that only half of a sphere cooperates on said elements to effect the desired resistance between elements 3 and 4$^1$.

In Fig. 2 the same numbers indicate the same parts, and this figure shows how said shiftable unit is assembled. The ring 1 forms on the inside a surface for the rollers 2 and for the three extensions 3f on the inner ring 3. Said ring carries internal teeth 1a, as can be seen from the left, lower broken part of Fig. 2, and these teeth are omitted for a certain distance, like the external teeth 3a on the inner ring. These two rows of teeth would prevent the inner ring from being inserted in the outer ring, unless the teeth 1a and 3a are omitted in three spots corresponding to the extensions 3f on the inner ring 3 to centralize said ring in the outer ring, when said freewheel is operating and the rollers 2 are not pinched between outer and inner ring. Said teeth 1a and 3a are omitted for a distance greater than necessary for said extensions 3f on the inner ring, and sufficient to insert at the same time, next to said extension 3f, the smallest of the rollers, or the sliding block 2a and spring 2c. By shoving said roller to the left it is possible to insert the next rollers, and finally the sliding block 2a and spring 2c resting on said extension 3f, and urging initially said rollers into the wedge of rings 1 and 3. It is seen that the inner ring 3 has three surfaces or cams, between said extensions 3f, eccentric to the center of the circle of the outer ring, so that when the ring 1 is rotated counterclockwise, or the inner ring 3 clockwise, the rollers 2 are pinched severely, and establish a solid drive between outer and inner ring. To keep said rollers in place, a ring 1d (see Fig. 1) has indentions corresponding to the internal teeth 1a of ring 1 and the external teeth of ring 3, and can therefore be inserted between the outer and inner rings 1 and 3, so that these two rings approach the rollers between said rings 1 and 3, and keep them in proper, stable, relation. Said rings 1d are further kept in place by expansible rings 1c, which fit into indentions in the teeth 1a or 3a (and 1b or 3b, to the right), so that the ends of the rollers are next to the rings 1d, and yet cannot shove these rings to the left or right on account of expansible rings 1c.

In the extensions 3f are radial holes, in which fit plungers 3e, springs 3d urging said plungers inwardly, and plugs 3c preventing springs and plungers from pressing upon the smooth surface for the rollers of ring 1, and spoiling said surface. Said plungers 3e press upon said rods 4, which are shown in Fig. 2, so high that their under surface slides on the curve of the surface of shaft 5. Three such rods are shown in Fig. 2, all of the same height, or thickness, and playing no role in transferring the power of the motor to the wheels, or reversely. The three splines 5a, 5b, 5c, shown in the inner ring 3 and shaft 5, transfer this power from one shaft to the other. The length of inner ring 3 is, in practice, about 50% larger than shown, about three inches, and the height of these three splines is sufficient for most average strains. If it is considered desirable to increase the pressure surface between 3 and 5, the rods 4 can be lessened in thickness as shown at 4b' in Fig. 3, so that the rod 4 slides on top of the spline of shaft 5. Another variation is shown in the same figure at 4a', in which the height of the rod is increased and may function as an additional spline, besides the three other ones 5a, 5b, 5c, when some shiftable gears and gears on shafts 6 and 5 are meshed. In this latter case, when a gear shift is made with or without the use of the clutch pedal 23, the rods 4 will be released from pressure or strain, as shafts 5 and 6 are practically released from each other, by cutting off the gas or depressing the clutch pedal 23 (Fig. 6). The constructions of 4 and 4b' are somewhat preferable to that of 4a', as in the former case the rods 4 and synchromesh clutch elements 13 and 15e are always released from any pinching on account of stresses between shafts 5 and 6. Another variation, shown in Fig. 7 and discussed later, is equivalent to the construction explained for 4a' in certain respects only.

Fig. 4 shows the relative position of the rods 4 below the clutch members 9 and 10, and alternate in end view with the three splines 5a, 5b, 5c. The synchromesh clutch elements 13 and 15e are provided always with six splines, three of which are for the rods 4, the other three for the three splines 5a, 5b, 5c. In the case of the form of rod 4, see Fig. 3, the height of the spline is greater than for splines 5a, 5b, 5c, and runs clear to the depth of said splines. In case of the form of 4b' and 4a' the depth of the 3 splines are the same as for the type of rod 4, which is from the inner beveled surface to the surface of the central hole for shaft 5 in said clutch elements. For the other 3 splines 5a, 5b, 5c, the spline begins at a distance from the beveled surface. If the splines 5a, 5b, 5c are deepened, as shown at 5d in Fig. 3, they will be all six of the same depth in the clutch elements 13 and 15e. However, the depth of the splines 5a, 5b, 5c cannot be too great, as it would weaken the inner ring 3 too much in view of the great pressure of the rollers, and if the size of ring 3 is increased, ring 1 has to be increased, and gears 8, 19, 19a and 15 have to be increased in size, and the gears on the countershaft have to be increased. Space is limited in this construction. The rods 4 (or 4a' or 4b') are preferably attached to said clutch elements by means of plugs 13a, perpendicular to said rods.

Fig. 5 shows the holes in the rods corresponding with the lower end of the three plungers 3e, and the three radial plugs 13a. There may be 5 holes in these three rods, or only 3, eliminating synchromesh for freewheel position. In Fig. 5 the central hole is elongated, and prevents the action of the synchromesh clutch elements upon a shift from neutral position to freewheel position. Fig. 5A shows five holes. The center hole c corresponds to neutral shift position, hole b corresponds to freewheel high position, hole a to solid high gear position, hole d to second gear freewheel position, hole e to solid high gear drive position.

Fig. 6 shows the conventional sequence of the motor, clutch, gear box and differential with wheels.

Fig. 7 shows a modification of Fig. 2 for the element 4.

The operation of the device is as follows: If the fork 1e moves to the left the plunger 3e has to be lifted out of the hole c shown in Fig. 5A, and the spring offering resistance, the lever 22 will move the whole unit 1, 2, 3, plus the rods 4 and the clutch elements 13, 15e to the left, until beveled faces 12, 11 meet each other and offer so much resistance that plunger 3e is pushed out of the depression c, and further movement of the gear lever 22 meshes clutch member 1a with clutch member 9 for high-speed freewheel. About at the same time plunger 3e dips into hole b of rod 4, which is slightly further removed from c than the shift and fixes the position of the clutch surfaces 11 and 12 so that in case of freewheeling these surfaces do not press upon each other, as the dipping of the plungers 3e pushes the rods and clutch elements a little backwards to the right, so that the clutch surfaces 15d and 15e do not touch each other either. The distance between the ring 3, and the side of clutch member 13, is reduced to half as indicated halfway on the arrow, shown between the two. The power from the motor is transferred from shaft 6, via clutch members 9 and 1a, via the rollers 2 to the ring 3, and from the ring 3 via the splines 5a, 5b, 5c to the transmission shaft 5, to the wheels. If the gas is cut off from the motor, the shaft 5 will overrun the shaft 6, if the car moves faster than the motor. The surfaces 11, 12 have then different speeds with respect to each other.

Moving the lever 22 further, the operation of the plungers 3e and holes b and a are the same as in the previous case, though in this case their function is more important than in the previous case. The overrunning clutch makes a shift between clutch members 9 and 1a very easily, as the rotational speed of the ring 1 can be quickly varied without exerting great forces, but in the case of meshing clutch members 10 and 3a conditions are vastly different. For instance, if the clutch members 1a, 1b, 3a and 3b are in neutral position, the friction of the rollers 2 between rings 1 and 3 rotates the whole unit 1, 2, 3 with the speed of the car and the wheels. If the motor has a speed varying from the car speed, it is evident that it would be impossible to mesh clutch members 9 and 1a from neutral position unless clutch member 1a had some rotational speed, and the same applies for clutch member 3a to be meshed with clutch member 10. Clutch member 1a of outer member 1 can easily change its rotational speed to the speed of clutch member 9, as the outer member 1 has little rotational momentum after the gear box is freed from the motor and is free to rotate at a speed less than that of the driven shaft 5. As soon as the clutch members 1b and 15a are freed from each other upon a shift, the clutch shaft 6 loses rotational speed and the outer member 1 can readily adjust itself to the speed of shaft 6. Reversely, when shifting from high-gear freewheel into second-gear freewheel, the clutch members 9 and 1a are released from each other and the clutch shaft 6 loses again immediately rotational speed being released from the shaft 5 and the car. Equally here the clutch member 1b can readily adjust its speed to the retarded speed of clutch member 15a retarded in speed. Therefore on shifts to a higher from a lower gear, or reversely, the clutch shaft retards always its speed passing neutral and outer member 1, rotating with the speed of the car, is able to change its speed readily upon slight resistance exerted upon outer member either by the member 9 or 15a. However, when shifting from freewheel position into solid gear position the same conditions obtain as if the freewheel did not exist. For the solid shift the friction clutch elements 11 and 13 are indispensable, and equally 15d and 15e. Again, if the lever is shifted from freewheel, high-gear position into solid high-gear position, the speed of the clutch member 10 has been equalised to that of clutch member 3a on the transmission shaft 5, by means of said synchromesh clutch elements 11 and 13, and by means of the depression of clutch pedal 23, releasing clutch member 10 from the motor, so that the clutch shaft 6 has to be retarded, or speeded up, in rotation, according to the speed of the car relative to the speed of the clutch shaft, after release from said motor. The hole b is a little further from the hole c for neutral position than the shift, as shown in Fig. 5A, to bring the clutch element 13 a little to the right after the first shift to the left. The same can be done for hole a with respect to hole b, but this is of little importance, as shaft 5 rotates always in this position with the same speed as shaft 6, which it did not do in freewheel position, and friction between beveled surfaces 11 and 13 cannot exist. Therefore the holes or detents a and e are superfluous and can be eliminated.

Exactly the same conditions obtain, when shifting the unit 1, 2, 3 to the right for freewheel and solid gear position for second gear ratio between motor and wheels. The corresponding holes for plunger 3e are here d and e, and both holes are shown a little further from the central hole c than the shifting-gear distance in order to remove the beveled clutch elements from each other in their respective freewheel or solid gear positions, especially the former. The plungers 3e ride out of these detents c and d (see Fig. 5A) exactly before the positive clutch members 1b and 15a for freewheel position, and the positive clutch members 3b and 15b for solid gear drive, engage. In other words they free the clutch faces 15e and 15d before the positive clutches actually engage.

In the two outer positions, to the left and to the right, of the unit 1, 2, 3, the inner ring 3 will be adjacent to the sides of the clutch elements 13 and 15e, on the rods 4. Or to explain the relative positions of the unit 1, 2, 3 with respect to the shaft 5 and the rods 4 shortly, it is now evident, that the rods 4 and clutch elements 13 and 15e move only slightly with respect to said unit 1, 2, 3 and not more than is necessary to meet the beveled surfaces for synchronisation of clutch parts to be meshed. The whole unit 1, 2, 3, however, moves the full distance of each gear shift with respect to the shaft 5.

The usual notches in the shifting rod 20, shown at a, b, c, d, e in cooperation with a plunger, equivalent to the ones shown at 3c, d and e, to indicate to the driver the position of the gears, can be omitted on account of the notches a, b, c, d, e in the shifting clutch rods 4. These notches 20b, c, d may be, however, retained, if the central notches b, c, d are displaced by a single long notch, eliminating the function of the synchromesh for freewheel position. The other gears, the low gear between gears 17 and 18a, and 18b' (reverse) are of standard construction, and it is further evident that, if a third and fourth forward gear is applied that the same unit 1, 2, 3 for these gears could effect synchronisation before the meshing of any gears, whether for freewheel position or solid drive position. The application of the rods 4, as shown in Fig. 5 is preferred to that of the rods shown in Fig. 5A, as in freewheel position the gear shift may be done by merely cutting off the gas as shown at 22a in Fig. 6 to the motor to release the shaft 5 from shaft 6. In that case, shaft 6 remains connected with the motor and the clutch elements 13 and 15e are not moved and not able to retard the motor speed, or accelerate the motor speed, to engage clutch members 9 and 1a, 1b and 15a, with synchronisation of speeds. In this case the ring 1 adjusts itself to intermeshable speed, thanks to the freewheel action. However, if the clutch between motor and gear box is used, and the 3 notches b, c, d are used, the gear shift is doubly insured to be silent, as the slightest difference in intermeshable speed will be taken up, either by the clutch elements 13 and 15e, or by the freewheel between rings 1 and 3.

It is understood that the gears 8 and 19, and 19a and 15c, may be spiral gears to insure a quiet transmission for second speed. The same type of gears may be applied, if a third and fourth speed forward is installed, in which the other four gears involved will be in constant mesh like the present four gears, as shown.

Fig. 7 shows that the three or more rods 4, may be replaced by a ring $4^1$, which is externally splined to inner ring 3, and internally splined to driven shaft 5. If the motor is pulling this ring $4^1$ (or intermediate element $4^1$) is pinched between 3 and 5, but released as soon as the freewheel operates, or the front clutch frees the gear set from the motor. In both cases, both synchronisations can be operated before gear shift from neutral position into freewheel; or into solid drive position, immediately or from freewheel position, in which latter cases, at the higher speeds, declutching is imperative for silent mesh for solid gear position.

It is understood that said single element $4^1$ between ring 3 and shaft 5 may be provided with the same two variations of notches, as shown for the rods 4 in Fig. 5 and Fig. 5A.

It is further understood that only the single, elongated, hole $b$, $c$, $d$ as shown in the first rod 4 of Fig. 5, may be used in rod 4 or in the connector $4^1$ of Fig. 7A. The outer holes $a$ and $e$ to release the friction clutch elements from each other after a gear shift is completed, are superfluous for the arrangement of Figs. 7 and 7A. The drive from the motor to the wheels and reversely, always passes here the splines between shaft 5 and connector $4^1$, and the splines between connector $4^1$ and member 3, carrying the positive clutch members, so that the connector $4^1$ is kept in place. And in so far as the corresponding friction clutch elements rotate always with the speed of the corresponding positive clutch members, there cannot be any rubbing action between said friction clutch elements. In the arrangements of Fig. 3 or 4 the rods 4 may gradually work themselves towards the other gear wheel as the power is not transmitted via said rods 4, so that they may move longitudinally together with the friction clutch elements.

When the plungers $3e$ are located in the holes or depressions $a$, they prevent this longitudinal shift, so that the friction clutch elements $15d$ and $15e$ cannot come into contact with each other. Reversely when in second gear, the holes $e$ together with plungers $3e$ prevent that the friction surfaces 11 and 13 come into contact with each other.

When using the connector $4^1$ of Figs. 7 and 7A, these depressions $a$ and $e$ become superfluous, as the connector $4^1$ cannot move. Therefore for the construction of Figs. 7 and 7A, it is preferred to use only a single central elongated depression, or a single short depression, if the freewheel shift is omitted.

Another advantage of this latter construction is that the plungers $3e$ not located in a depression when in high or second gear, do not move the connector $4^1$ and the friction clutch elements associated therewith (or actuated by said connector), until the gear shift lever has moved the shifting unit in neutral, where the plungers $3e$ pick up again the connector $4^1$.

In the drawings are shown springs with plungers, with rounded heads, but ordinary balls will do just as well.

The rounded heads are shown to rest upon the connector, but when the freewheel shift is omitted and more, and different, space is obtainable to locate the various parts of the present synchromesh shift, the position of springs and plungers or balls may be, of course, reversed. However these yieldable, elastic, resilient means, will always be only associated with the parts $4^1$ and 3, and this spring tension will and must always operate exclusively between the element $4^1$, carrying the friction faces or friction clutch elements, 5 and the element 3 carrying the positive clutch members.

The male and female parts of this synchromesh clutch may be equally reversed in position without altering the principle proposed.

In any of these modifications it is highly important that the indentions $c$ in the connector are spherical without an inclined track. The spherical or rounded ends of the elements $3e$ have to be lifted out suddenly from their corresponding spherical indentions $c$ in order to decrease suddenly the resistance against the shift and to release sharply and suddenly the corresponding conical faces before a positive clutching of the driving and driven shafts take place. This construction is considered imperative to the proper functioning of the synchromesh action at any speed of the car, and any speed of the shift, although it is preferred to make a shift not too fast.

If the freewheel or one-way clutch between the members 1 and 3 is omitted, the positive clutch members $3a$ and $3b$, or the positive clutch members $1a$ or $1b$, can be used and the other pair eliminated of course. Preferably the pair of clutch members $3a$ and $3b$ are eliminated allowing a larger diameter for the body of the connector $4^1$.

Likewise the spherical or round indentions $a$ and $e$ shown in Fig. 5A may be more shallow than the central round indentions $c$ because these outer indentions $a$ and $e$ merely serve to keep the friction clutch elements on the other side of the shiftable unit free from each other when in gear on one side thereof. When shifting backwards in the other gear the connector $4^1$ may be moved initially slightly with the outer member 1, but the rounded ends will jump readily out of these more shallow indentions. The central indentions $c$ have to be made as deep as will allow the round heads of the plungers to jump out of them upon a shift and as deep as the leverage of the standard gear shift lever will allow without creating too great a resistance. The number of said indentions arranged in radial direction on the connector $4^1$ (or on the inside of the member 3, in case the plungers and indentions are reversed in position) depends also upon the required friction, number of plungers, length of gear shift lever, etc., and the slant of the corresponding conical friction faces.

In so far as this slant cannot be too sharp, otherwise these faces will not suddenly release each other, the resistance of the plungers and spherical indentions must be sharp and abrupt in order to effect the proper pressure between these conical faces. It is evident that this is a delicate and precise relation and that the rounded heads on the plungers are fully equivalent to pure spherical balls fitting into spherical indentions.

It is further shown in Fig. 1 that the conical friction faces may be made detachable so that another metal may be used in order to raise the coefficient of friction between these two corresponding faces.

In case the rods are used as shown in Fig. 3, the variation designated by $4b^1$ and by 4 in Fig. 3 are preferred, as in said variation there is less chance that they will be pinched between the shaft 5 and the outer member 3 shifted by the fork 1e.

In the variation designated by 4 in Figs. 3, 4 and 2, the spline is removed and this same construction may be aplied on the variation of Fig. 7, in which the rods 4 of Fig. 5 are displaced by said connector 4¹. In case the splines have a small width in circumferential direction, there would not be sufficient place on them to construct a spherical indention c (and eventually a and e) in them, and one or two splines have to be removed. The space between the splines left on the body 4¹ may be either left round, as shown in Figs. 3, 4 and 2, or may be flattened. In either construction there will be enough room to bore the said spherical indentions.

Another particular feature of my construction is the mounting of the freely rotating gear wheel 15 on an enlarged portion or diameter of the driven shaft 5. In standard constructions such a freely rotating gear wheel is steadied by means of two detachable rings on either side of said gear wheel and attached in some way to the driven shaft. These constructions are as a rule difficult to mount and dismount and what is more important they do not provide the necessary bearing surfaces in directions perpendicular to the axis of the driven shaft and they do not guarantee an absence of weaving or wobbling of said gear wheel on said shaft. The present construction of the gear wheel having an overhanging edge to the left fitting one perpendicular side of said enlarged portion and a detachable ring 16 fitting the other side of said enlarged portion causes said gear wheel to run true in a plane perpendicular to the axis of the shaft 5. Especially where said gear wheels 8, 19, 19a and 15 are helical gears this construction is very effective and prevents further the possibility that the positive clutches 3b or 1b work themselves loose from the corresponding clutch members 15b and 15a, because said gear wheel can have no play on said enlarged portion by said construction having liberal bearing areas in directions perpendicular to the axis of the shaft and parallel to the axis of the driven shaft.

I claim:

1. The combination of two aligned shafts, the left shaft having an external clutch member on the outside thereof and an internal clutch member on the inside thereof, an overrunning clutch slidably mounted on the right shaft, said overrunning clutch composed of an outer ring and an inner ring and rollers therebetween, said outer ring having an internal clutch member to be meshed with the external clutch member on the left shaft, said inner ring having an external clutch member to be meshed with the internal clutch member of the left shaft, a friction clutch face on the inside of the left shaft to the left of said internal clutch member, a friction clutch face on an element between the inner ring of said overrunning clutch and said right shaft which has a bearing in said left shaft, said element being non-rotatably slidable on said right shaft, resilient means between said inner ring and said element to force said clutch faces on said left shaft and on said element against each other upon a shift of said overrunning clutch to the left prior to meshing the clutch member of the outer ring with the external clutch member of the left shaft.

2. The combination of claim 1, with means to employ the same resilient means between said inner ring and said element to engage the same clutch faces a second time prior to meshing the external clutch member on the inner ring with the internal clutch member of the left shaft for two-way transmission between these two shafts.

3. The combination of two aligned shafts, a gear wheel rotatably mounted on the right shaft in fixed position, said gear wheel having on the left outside periphery a clutch member and on the left inside thereof an internal clutch member and a friction clutch face on the inside thereof to the right of said internal clutch member, an overrunning clutch slidably mounted on the right shaft, to the left of said first gear wheel loosely mounted on the same right shaft, said overrunning clutch composed of an outer ring having on the right side an internal clutch member to be meshed with the external clutch member on said freely rotating gear wheel, and an inner ring having an external clutch member to be meshed with the internal clutch member of said freely rotating gear wheel, said inner ring having a one-way transmission with said outer ring and being both simultaneously shiftable over a body, slidable on said right shaft, carrying on the right side a friction clutch face to be engaged with the friction clutch face to the right of said internal clutch member on the inside of said freely rotating gear wheel, elastic resilient means between said inner ring and said body adapted to force upon a shift of said outer ring to the right said clutch faces against each other prior to the meshing of the clutch members on said outer ring and said freely rotating gear wheel, and prior to the establishing of a one-way transmission between said right shaft and said freely rotating gear wheel, said body carrying said clutch face being slidable on said right shaft and slidable with respect to said inner ring.

4. The combination of claim 3, with additional means to use the same resilient means to effect a second meeting of said clutch faces prior to the meshing of said external clutch member on said inner ring with the internal clutch member of said freely rotating gearwheel to establish a two-way drive.

5. The combination of two aligned shafts, and of an overrunning clutch between said two shafts, and a friction clutch between said two shafts, said overrunning clutch being shiftable but non-rotatable on the right shaft of the two, one element of said friction clutch being also non-rotatably fixed on said right shaft on a member between said overrunning clutch and said right shaft, but being shiftable with respect to said overrunning clutch and said right shaft by means of resilient means operating between said overrunning clutch and said member upon a shift of said overrunning clutch, said resilient means between said overrunning clutch and said member not operating upon a first shift of said overrunning clutch to the left, but forcing the elements of said friction clutch upon each other prior to establishing a two-way drive between the inner ring of said overrunning clutch and said left shaft.

6. The combination of claim 5, combined with a freely rotating gear wheel on said right shaft carrying also a clutch member for a one-way drive between said right shaft and said gear wheel, and a clutch member for a two-way drive between the two, a right friction face on a member under the inner ring of said overrunning clutch and a friction face on said freely rotating gear wheel to the right of said clutch member for two-way drive, said same resilient means only operating upon a second shift of said overrunning clutch to the right to force said clutch faces upon each other prior to a two-way drive between the right shaft and freely rotating gearwheel, said gear wheel rotating upon an enlarged diameter of said right shaft, a plate attached to said gear wheel and overhanging said enlarged diameter, said gear wheel overhanging said enlarged diameter on the other side thereof.

7. The combination of two aligned shafts, an overrunning clutch and a friction clutch element slidable on each other but non-rotatable on the right shaft thereof, said clutch having an outer ring and an inner ring and rollers between the two, and providing a one-way drive via said outer ring and a two-way drive via said inner ring, resilient means associated with the inner ring of said overrunning clutch to operate said friction clutch face together with a component clutch face on said left shaft prior to a two-way drive between the two shafts upon a shift of the one-way-drive part of said overrunning clutch, the one- and two-way drive parts of said overrunning clutch being endwise non-slidable.

8. The combination of claim 7 combined with additional means between said friction clutch element and the two-way drive part of said overrunning clutch to operate said friction clutch elements also prior to a one-way drive between the shafts upon a shift effected upon said overrunning clutch.

9. The combination of two aligned shafts, an overrunning clutch and a friction clutch element on one shaft but operating between the two, said friction clutch element being fixed upon a body between said overrunning clutch and one of said shafts, indentions upon said body cooperating with plungers radially arranged in said overrunning clutch, said plungers driven inwardly and radially by springs into said indentions, means to shift said overrunning clutch so that said plungers, engaged in said indentions, force said friction clutch face into engagement with a similar friction clutch face on the other shaft, while said overrunning clutch is operative between the two shafts, said overrunning clutch and said friction clutch face being non-rotatably but slidably fixed on said first shaft, and slidable with respect to each other.

10. The combination of claim 9, in which said body between said overrunning clutch and said first shaft is composed of a plurality of rods, carrying on the outer ends thereof said friction clutch face, said rods being longitudinally slidable on splines on said shaft but do not transmit any rotational force between said shaft and said overrunning clutch.

11. The combination of claim 1, in which said element consists of a single body carrying on its outer end said friction clutch face, said single body being splined outside for the inner ring of said overrunning clutch and being splined inside to be slidable and non-rotatable on said right shaft, indentions or holes on the outside of said body, said resilient means composed of radially arranged plungers, the inward ends of which are pressed into said holes by springs located in the inner ring of said overrunning clutch, said holes and resilient means resisting relative endwise displacement of the overrunning clutch and said element until the pressure exerted upon said overrunning clutch lifts the plungers out of said holes prior to meshing said shafts together with clutch members via the inner ring of said overrunning clutch for two-way drive.

12. The combination of two shafts aligned, one having a bearing in the other shaft, an overrunning clutch in actual operation between the two, a friction clutch face on one of said shafts and on a member associated with said overrunning clutch, said member slidable but non-rotatable between said overrunning clutch and said other shaft and being in resilient relation to said overrunning clutch but not with said other shaft, said resilient means consisting of an intermediate long indention on the outside of said member and two indentions of smaller length on either side thereof, radially arranged resilient plungers in the inner ring of said overrunning clutch cooperating with said long indention when said shafts are in one-way drive position to prevent the friction of said two friction clutch faces, said plungers operating with said other two indentions in said member to cause a friction between said same clutch faces prior to connecting said two shafts to each other for a two-way drive.

13. A synchromesh gear shift clutch composed of two cylindrical elements splined to each other, the inner one being splined on a shaft and slidable thereon, the outer one being splined on said inner element and slidable thereon, two power gear wheels on opposite sides of said clutch and coaxial with said shaft, positive clutch members on said outer element and corresponding positive clutch members on said two power gear wheels, friction clutch elements on said inner element and corresponding frictional clutch elements on said two power gear wheels, yieldable means between said two cylindrical elements, means to shift said outer element, said latter means in cooperation with said yieldable means holding said friction clutch elements on said inner element free from the corresponding clutch elements on said gear wheels in neutral position, said yieldable means between said two cylindrical elements located upon surfaces of at least one of said two cylindrical elements where the splines between said outer and inner elements are removed,—said yieldable means consisting of plungers in one cylindrical element and cooperating indentions in the other cylindrical element.

14. A synchromesh gear clutch composed of two cylindrical elements, the outer element splined on an inner element and slidable thereon, said inner element splined on a shaft and slidable thereon, said shaft having a bearing in another shaft, a gear wheel on said other shaft solidly connected thereon, a freely rotating gear wheel on said first shaft, said gear wheels on opposite sides of said clutch and in constant mesh with a countershaft, positive clutch elements on said outer element, and on said gear wheels, friction clutch elements on said inner element and on said gear wheels, yieldable means between said two cylindrical elements and means to shift said outer cylindrical element, said latter means in cooperation with said yieldable elements holding said friction clutch elements on said inner element free from the corresponding friction clutch elements on said gear wheels in neutral position, said yieldable elements consisting of spherical indentions in one of said cylindrical elements and corresponding spherical elements associated with the other of said cylindrical elements, elastic elements pressing said spherical elements into said spherical indentions, said spherical indentions constructed upon the outer surface of said first inner element where the splines between said outer and inner elements are removed.

15. A transmission gear set, said gear set having a clutch shaft and a driven shaft in said gear set, a one-way clutch on said driven shaft so that said driven shaft may overrun said clutch shaft, a plurality of driving elements between said clutch shaft and driven shaft, a synchromesh friction clutch element on said clutch shaft and another component synchromesh friction clutch element on a shiftable unit on said driven shaft between said driving elements, a shiftable member, resiliently associated with said shiftable unit, carrying a positive clutch member to be engaged with a positive clutch member on said clutch shaft, said latter shiftable member shiftable on said driven shaft but equally non-rotatably fixed on said driven shaft, said component friction clutch elements synchronising said clutch shaft with said driven shaft and said positive clutch members connecting said clutch shaft with said driven shaft by means of said one-way clutch upon a shift when said driven shaft overruns said clutch shaft.

16. In a vehicle, a gear set, a clutch shaft in said gear set, a propeller shaft associated with said clutch shaft by means of a one-way clutch coaxially arranged between said shafts, a plurality of driving elements between said propeller shaft and said clutch shaft, a plurality of component synchromesh friction clutch elements on said driving elements and on a shiftable member non-rotatably but slidably fixed on said propeller shaft and between said driving elements, means to synchronize the speeds between said clutch shaft and propeller shaft by means of said synchromesh friction clutch elements, means to positively connect said clutch shaft and propeller shaft by means of component positive clutch elements on said driving elements and said shiftable member, said clutch shaft and propeller shaft being synchronised upon a shift of said shiftable member and by the overrunning action of said one-way clutch.

17. A transmission gear set, said gear set containing a driving shaft connected to a driven shaft by means of a one-way clutch located on said driven shaft, a plurality of driving elements between said driving and driven shafts, a plurality of positive clutches effecting various gear ratios between said driving elements, and the driven shaft, a plurality of friction synchromesh clutch elements associated with said driving elements, means to synchronise said shafts by said synchromesh clutch elements prior to connecting them positively, said synchromesh means operating in cooperation with said one-way clutch between said shafts.

18. In a vehicle, a plurality of gears between a driving shaft and a driven shaft in a gear set in constant mesh with gears on a countershaft, said gears on said driven shaft rotating loosely thereon, component synchromesh means and component positive clutch means on said gears and on a shiftable member between said gears, a one-way clutch associated with said shafts and located between said positive clutch members and said driven shaft, said synchromesh means operating when one of said shafts overruns the other shaft by means of said one-way clutch means but prior to the positive clutching between said gearing by said positive clutch means upon and during a gear shift.

19. In a vehicle, a gear set, a clutch shaft in said gear set, a propeller shaft to be placed in driving connection with said clutch shaft by means of a one-way clutch located on said propeller shaft, a plurality of driving elements between said propeller shaft and clutch shaft, a plurality of component synchromesh friction clutch elements and component positive clutch members on said driving elements and on a shiftable member non-rotatably but slidably fixed on said propeller shaft, means to synchronise the speeds between said clutch shaft and propeller shaft by means of said synchromesh friction clutch elements, means to connect said clutch shaft to said propeller shaft by means of said one-way clutch located between said driven shaft and said positive clutches on said shiftable member and driving elements on said propeller shaft, said clutch shaft and propeller shaft being synchronised upon a shift by said synchronising means prior to said one-way clutch being placed in operation between said two shafts so that said driven shaft may overrun said clutch shaft after said gear shift, and positive clutch means between said two shafts to eliminate said overrunning function between said two shafts upon a further shift.

20. In a transmission, a gear set containing a driving shaft adapted to be connected by means of a one-way clutch located on a driven shaft to said driven shaft, a plurality of forward drives between said driving and driven shafts, including a plurality of component positive clutches and a plurality of component friction synchromesh clutch elements associated with gears on said shafts and on a shiftable unit on said driven shaft between said gears, said one-way clutch located between said positive clutches on said shiftable unit and said driven shaft, means to synchronise said shafts by said synchromesh clutch elements upon a shift prior to placing said one-way clutch in operative connection between said two shafts so that said driven shaft may overrun said driving shaft.

21. In a power transmission, two shafts aligned with each other, on a driven shaft having a bearing in the other shaft, gears freely rotating on said driven shaft, and in constant mesh with gears on a countershaft parallel to said first two shafts, a shiftable unit between the said driven shaft and said freely rotating gears thereon, a one-way clutch in operative association with said shiftable unit and said driven shaft, component synchromesh clutches and positive clutches on said freely rotating gears and said shiftable unit, said one-way clutch allowing said component synchromesh clutches to synchronise said gears and shiftable unit for a silent shift between them by the overrunning action of said one-way clutch.

22. In a vehicle, a gear set composed of a gear fixed on a driving shaft, and a gear loosely rotating on a driven shaft, a one-way clutch between said two shafts but located on said driven shaft, positive clutch means between said gears and said one-way clutch, synchromesh means operative between said driven shaft and said gears, means to shift said positive clutch means and to operate said synchromesh means by said shift prior to the positive clutching of said gears by said positive clutch means but simultaneously with the overrunning action of said one-way clutch.

23. In a vehicle, a gear set composed of a fixed gear on a driving shaft and a loosely rotating gear on a driven shaft, positive clutch members between said gears and said driven shaft to effect gear ratios between said shafts, a one-way clutch adapted to be operated between said two shafts and located on said driven shaft, synchromesh means between a shiftable unit on said driven shaft and said gears, said synchromesh means synchronising said shafts upon a shift and prior to the operation of said one-way clutch between said driven shaft and driving shaft.

24. In a vehicle, a gear on a driving shaft and a gear loosely rotating on a driven shaft in a gear set in said vehicle, synchromesh means and positive clutch means between said gears and said driven shaft, a one-way clutch adapted to operate between said shafts, means to operate said synchromesh means prior to placing said shafts in operative overrunning clutch position with each other by means of said one-way clutch.

25. Power transmission mechanism comprising a drive member, a driven member, means associated with said members for establishing an overrunning drive therebetween, said means comprising interengageable teeth, means including interengageable teeth for establishing a two-way drive between said members, and instrumentalities for synchronising the teeth of each of said means immediately prior to interengagement.

26. Power transmission mechanism comprising drive and driven members, tooth means for establishing an overrunning one-way drive between said members, means for synchronising said tooth means so that the same may be interengaged without clashing, instrumentalities including teeth for establishing a two-way drive between said members, means for synchronising said teeth to enable same to be interengaged without clashing, and shifting means associated with said means and instrumentalities for progressively establishing each of the conditions mentioned.

J. A. H. BARKEIJ.